US006313216B1

(12) United States Patent
Christian et al.

(10) Patent No.: US 6,313,216 B1
(45) Date of Patent: Nov. 6, 2001

(54) SYNTHESIS OF STYRENE-ISOPRENE RUBBER

(75) Inventors: Scott McDowell Christian, Clinton; Zhengfang Xu, Stow; Michael Lester Kerns, Elyria, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/654,176

(22) Filed: Sep. 1, 2000

(51) Int. Cl.$^7$ .......................................................... C08L 9/06
(52) U.S. Cl. .......................... 524/575; 524/856; 525/271; 525/313; 525/332.3; 525/332.9; 526/65; 526/73; 526/87; 526/88; 526/340
(58) Field of Search ................................ 526/65, 73, 340, 526/87, 88; 525/332.3, 332.9, 271, 313; 524/575, 856

(56) References Cited

U.S. PATENT DOCUMENTS

| | | | |
|---|---|---|---|
| 5,336,737 | * | 8/1994 | Van Ballegooijen et al. ... 526/340 X |
| 5,470,929 | * | 11/1995 | Zanzig et al. ..................... 526/340 X |
| 5,679,751 | * | 10/1997 | Halasa et al. ..................... 526/340 X |

* cited by examiner

*Primary Examiner*—Fred Teskin
(74) *Attorney, Agent, or Firm*—Alvin T Rockhill

(57) ABSTRACT

This invention discloses a process for synthesizing random styrene-isoprene rubber comprising: (1) continuously charging isoprene, styrene, an initiator, and a solvent into a first polymerization zone, (2) allowing the isoprene and styrene to copolymerize in the first polymerization zone to total conversion of 60 to 95 percent to produce a polymer cement containing living styrene-isoprene chains, (3) continuously charging the polymer cement containing living styrene-isoprene chains and additional isoprene monomer into a second polymerization zone, wherein from 5 to 40 percent of the total amount of isoprene changed is charged into the second polymerization zone, (4) allowing the copolymerization to continue in the second polymerization zone to a conversion of the isoprene monomer of at least 90 percent wherein the total conversion of styrene and isoprene in the second polymerization zone is limited to a maximum of 98 percent, (5) withdrawing a polymer cement of random styrene-isoprene rubber having living chain ends from the second reaction zone, (6) killing the living chain ends on the random styrene-isoprene rubber, and (7) recovering the random styrene-isoprene rubber from the polymer cement, wherein the copolymerizations in the first polymerization zone and the second polymerization zone are carried out at a temperature which is within the range of 70° C. to 100° C., and wherein the amount of styrene charged into the first polymerization zone is at least 2 percent more than the total amount of styrene bound into the rubber.

20 Claims, 2 Drawing Sheets

SYNTHESIS OF STYRENE-ISOPRENE RUBBER

BACKGROUND OF THE INVENTION

Figure 1A:
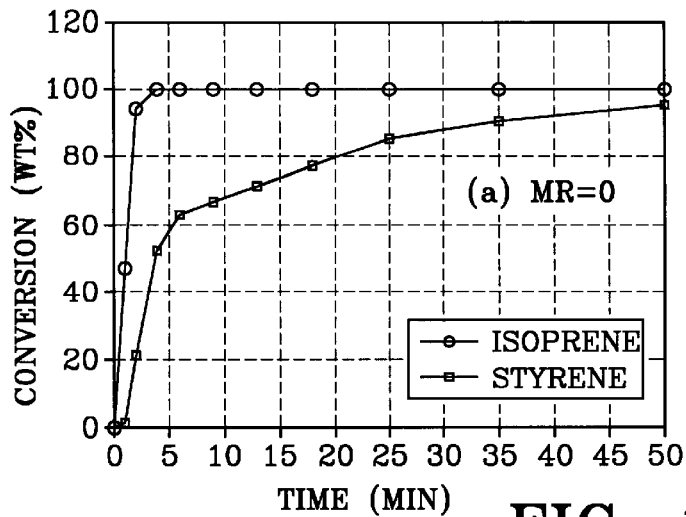

It is desirable for a tire to exhibit good traction characteristics on wet and dry pavements, and for the tire to provide good treadwear and low rolling resistance. In order to reduce the rolling resistance of a tire, rubbers having a high rebound can be utilized in making the tires' tread. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-isoprene rubber (SBR), polyisoprene rubber, and natural rubber are commonly used in automobile tire treads formulations. Styrene-isoprene rubber is included in tire tread formulations primarily to improve the traction characteristics of the tire without greatly compromising tread-wear or rolling resistance.

The versatility of solution SBR (SSBR) synthesis relative to the synthesis of emulsion (ESBR), including control of molecular weight, macrostructure, microstructure, and functionalization, is well established (see Hirao, A.; Hayashi, M. Acta. Polym. 1999, 50, 219–231, and references cited therein). Performance advantages arising from this versatility have led to an acceleration of the replacement of emulsion SBR in the tire industry, and an expansion in the market for random, low vinyl SBR for use in tire compounds (see Autcher, J. F.; Schellenberg, T.; Naoko, T. "Styrene-Butadiene Elastomers (SBR)," Chemical Economics Handbook SRI-International, November, 1997). These developments have stimulated interest in developing technology for commercial production of random, low vinyl solution SBR.

Although anionic initiated synthesis of random medium vinyl solution SBR and random high vinyl solution SBR is easily accomplished by the addition of Lewis bases, these polar modifiers promote randomization at the expense of increased vinyl content (see Antkowiak, T. A.; Oberster, A. E.; Halasa, A. F.; Tate, D. P. J. Polym. Sci., Part A-1, 1972, 10, 1319). Due to the large differences in monomer reactivity ratios of isoprene and styrene, measures must be taken to promote random incorporation of styrene into low vinyl solution SBR In the absence of such measures, the polymerization leads to a tapered block copolymer with inferior elastomeric performance characteristics (see U.S. Pat. No. 3,558,575).

British Patent 994,726 reports that it is possible to produce random solution SBR by manipulating monomer polymerization rates via control of monomer concentrations throughout the polymerization process without the use of polar modifiers. For solution SBR, this requires that the polymerization proceed in a styrene rich medium throughout the polymerization. In continuous polymerizations the issues associated with maintaining constant monomer concentration ratios while increasing conversion become quite complex.

U.S. Pat. No. 3,787,377 reports that alkali metal alkoxides (NaOR) can be used as polar modifiers in the copolymerization of styrene and isoprene to randomize styrene incorporation without significantly increasing the vinyl content of the rubber. However, alkali metal alkoxide modifiers are so effective that they may actually increase the rate of polymerization of styrene to the extent that it is depleted before the polymerization is complete (see Hsieh, H. L.; Wofford, C. F. J. Polym. Sci., Part A-1, 1969, 7, 461–469). Furthermore, there is typically some undesired increase in vinyl content over what would be expected from an unmodified polymerization (see Hsieh, H. L.; Wofford, C. F. J. Polym. Sci., Part A-1, 1969, 7, 449460).

SUMMARY OF THE INVENTION

A method to prevent the formation of tapered block solution SIR in unmodified polymerizations using standard continuous stirred tank reactors (CSTRs) has been developed. This method involves charging all of the styrene and part of the isoprene being polymerized into a first polymerization zone. The first polymerization zone is typically a continuous stirred tank reactor. The amount of styrene charged into the first polymerization zone will typically be at least 2 percent more than the amount of styrene bound into the styrene-isoprene rubber being synthesized. It is important for a conversion within the range of about 60 percent to about 95 percent to be attained in the first polymerization zone. Additional isoprene monomer is charged into a second polymerization zone, such as a second continuous stirred tank reactor. Typically from about 5 percent to about 40 percent of the total amount isoprene charged will be charged into the second polymerization zone. It is also important for a isoprene conversion of at least about 90 percent to be attained in the second polymerization zone and for the total conversion (styrene and isoprene) to be limited to a maximum of about 98 percent in the second polymerization zone.

This invention more specifically discloses a process of synthesizing random styrene-isoprene rubber having a low level of branching and a low vinyl content which comprises: (1) continuously charging isoprene, styrene, an alkyl lithium initiator, and an organic solvent into a first polymerization zone, (2) allowing the isoprene and styrene to copolymerize in the first polymerization zone to total conversion which is within the range of about 60 percent to about 95 percent to produce a polymer cement containing living styrene-isoprene chains, (3) continuously charging the polymer cement containing living styrene-isoprene chains and additional isoprene monomer into a second polymerization zone, wherein from 5 percent to 40 percent of the total amount of isoprene changed is charged into the second polymerization zone, (4) allowing the copolymerization to continue in the second polymerization zone to a conversion of the isoprene monomer of at least 90 percent, wherein the total conversion of styrene and isoprene in the second polymerization zone is limited to a maximum of 98 percent, (5) withdrawing a polymer cement of random styrene soprene rubber having living chain ends from the second reaction zone, (6) killing the living chain ends on the random styrene-isoprene rubber, and (7) recovering the random styrene-isoprene rubber from the polymer cement, wherein the copolymerizations in the first polymerization zone and the second polymerization zone are carried out at a temperature which is within the range of about 70° C. to about 100° C., and wherein the amount of styrene charged into the first polymerization zone is at least 2 percent more than the total amount of styrene bound into the random styrene-isoprene rubber. The living chain ends on the random styrene-isoprene rubber can optionally be killed by the addition of a coupling agent, such as tin tetrachloride.

The present invention also reveals a cement of living styrene-isoprene rubber which is comprised of an organic solvent and polymer chains that are derived from isoprene and styrene, wherein the polymer chains are terminated with lithium end groups, wherein the polymer chains have a vinyl content of less than 10 percent, wherein less than 5 percent of the total quantity of repeat units derived from styrene in the polymer chains are in blocks containing five or more styrene repeat units, and wherein the molar amount of polar modifier in the cement of the living styrene-isoprene rubber is at a level of less than 20 percent of the number of moles of lithium end groups on the polymer chains of the living styrene-isoprene rubber. Such cements of living styrene-isoprene rubber made by the process of this invention can be easily coupled because they contain very low levels of polar modifiers.

In cases where the polymerization is carried out in the presence of a significant level of a polar modifier it will be necessary to charge all of the isoprene into the first polymerization zone and to split the charge of styrene between the first polymerization zone and the second polymerization zone. Accordingly, the present invention further discloses a process for synthesizing random styrene-isoprene rubber having a low level of branching and a low vinyl content which comprises: (1) continuously charging isoprene, styrene, an organolithium initiator, a polar modifier, and an organic solvent into a first polymerization zone, (2) allowing the isoprene and styrene to copolymerize in the first polymerization zone to total conversion which is within the range of about 60 percent to about 95 percent to produce a polymer cement containing living styrene-isoprene chains, (3) continuously charging the polymer cement containing living styrene-isoprene chains and additional styrene monomer into a second polymerization zone, wherein from 5 percent to 40 percent of the total amount of styrene changed is charged into the second polymerization zone, (4) allowing the copolymerization to continue in the second polymerization zone to a conversion of the styrene monomer of at least 90 percent, wherein the total conversion of styrene and isoprene in the second polymerization zone is limited to a maximum of 99 percent, (5) withdrawing a polymer cement of random styrene-isoprene rubber having living chain ends from the second reaction zone, (6) killing the living chain ends on the random styrene-isoprene rubber, and (7) recovering the random styrene-isoprene rubber from the polymer cement, wherein the copolymerizations in the first polymerization zone and the second polymerization zone are carried out at a temperature which is within the range of about 70° C. to about 100° C., and wherein the amount of isoprene charged into the first polymerization zone is at least 2 percent more than the total amount of isoprene bound into the random styrene-isoprene rubber.

DETAILED DESCRIPTION OF THE INVENTION

The polymerizations of the present invention are carried out continuously in a first polymerization zone, such as a first reactor, and a second polymerization zone, such as a second reactor. These copolymerizations of isoprene and styrene are carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha and the like, alone or in admixture.

In the solution polymerizations of this invention, there will normally be from 5 to 30 weight percent monomers in the polymerization medium. Such polymerization media are, of course, comprised of the organic solvent, monomers, and an initiator. In most cases, it will be preferred for the polymerization medium to contain from 10 to 25 weight percent monomers. It is generally more preferred for the polymerization medium to contain 15 to 24 weight percent monomers.

In the polymerizations of this invention the styrene, isoprene, solvent, and initiator are continuously charged into the first polymerization zone. All of the styrene and a portion of the isoprene is charged into the first polymerization zone. The amount of styrene charged into the first polymerization zone is at least 2 percent more than the total amount of styrene bound into the random styrene-isoprene rubber being synthesized. In other words, at least 2 percent more styrene is charged into the first polymerization zone than will be polymerized during the polymerization in the first polymerization and second polymerization zone. It is preferred for the amount of styrene charged into the first polymerization zone to be at least 4 percent more than the total amount of styrene bound into the random styrene-isoprene rubber being synthesized. It is more preferred for the amount of styrene charged into the first polymerization zone to be at least 6 percent more than the total amount of styrene bound into the random styrene-isoprene rubber being synthesized.

The conversion attained in the first polymerization zone will be within the range of about 60 per to about 90 percent. It is preferred for the conversion attained in the first polymerization zone will be within the range of about 75 percent to about 95 percent. The polymer cement containing living styrene-isoprene chains and additional isoprene monomer made in the first polymerization zone is continuously charged into a second polymerization zone. About 5 percent to 40 percent of the total amount of isoprene charged into the first polymerization zone and the second polymerization zone is charged into the second polymerization zone. Preferably from 7 percent to 35 percent of the total amount of isoprene changed into the first polymerization zone and the second polymerization zone is charged into the second polymerization zone. Most preferably from 12 percent to 33 percent of the total amount of isoprene changed into the first polymerization zone and the second polymerization zone is charged into the second polymerization zone.

It is critical for the total conversion (styrene and isoprene) attained in the second polymerization zone to be held below about 99 percent and typically below about 95 percent. However, the isoprene will be polymerized in the second reaction zone to a conversion of at least about 90 percent. The isoprene will preferably be polymerized in the second reaction zone to a conversion of at least about 95 percent and will most preferably be polymerized to a conversion of 98 percent.

The copolymerizations of styrene and isoprene in the first polymerization zone and the second polymerization zone will be maintained at a temperature which is within the range of about 70° C. to about 100° C. At temperatures below about 70° C. the polymerization is too slow to be commercially acceptable. On the other hand, at temperatures above 100° C. thermal induced branching occurs to the extent that it adversely affects the hysteretic properties of the styrene-isoprene rubber. For these reasons, the polymerization temperature will normally be maintained within the range of 75° C. to 95° C., and will preferably be maintained within the range of 80° C. to 90° C.

The styrene-isoprene rubber made utilizing the technique of this invention is comprised of repeat units which are derived from isoprene and styrene. These styrene-isoprene rubbers will typically contain from about 5 weight percent to about 50 weight percent styrene and from about 50 weight percent to about 95 weight percent isoprene. The styrene-isoprene rubber will more typically contain from about 7 weight percent to about 40 weight percent styrene and from about 60 weight percent to about 93 weight percent isoprene. The styrene-isoprene rubber will preferably contain from about 10 weight percent to about 30 weight percent styrene and from about 70 weight percent to about 90 weight percent isoprene.

In the styrene-isoprene rubbers of this invention, the distribution of repeat units derived from styrene and isoprene is essentially random. The term "random" as used herein means that less than 5 percent of the total quantity of repeat units derived from styrene are in blocks containing five or more styrene repeat units. In other words, more than 95 percent of the repeat units derived from styrene are in blocks containing less than five repeat units. A large quantity of repeat units derived from styrene will be in blocks containing only one styrene repeat unit. Such blocks containing one styrene repeat unit are bound on both sides by repeat units which are derived from isoprene.

In styrene-isoprene rubbers containing less than about 30 weight percent bound styrene which are made with the catalyst system of this invention, less than 2 percent of the total quantity of repeat units derived from styrene are in blocks containing five or more styrene repeat units. In other words, more than 98 percent of the repeat units derived from styrene are in blocks containing less than five repeat units. In such styrene-isoprene rubbers, over 40 percent of repeat units derived from styrene will be in blocks containing only one styrene repeat unit, over 75 percent of the repeat units derived from styrene will be in blocks containing less than 3 repeat units and over 95 percent of the repeat units derived from styrene will be in blocks containing less than 4 repeat units. Normally less than 2 percent of the bound styrene in the styrene-isoprene rubber is in blocks of greater than 3 repeat units. Preferably less than 1 percent of the bound styrene in the styrene-isoprene rubber is in blocks of greater than 3 repeat units.

In styrene-isoprene rubbers containing less than about 20 weight percent bound styrene which are made with the catalyst system of this invention, less than 1 percent of the total quantity of repeat units derived from styrene are in blocks containing 4 or more styrene repeat units. In other words, more than 99 percent of the repeat units derived from styrene are in blocks containing less than 4 repeat units. In such styrene-isoprene rubbers, over 60 percent of repeat units derived from styrene will be in blocks containing only one styrene repeat unit and over 95 percent of the repeat units derived from styrene will be in blocks containing less than 3 repeat units. Normally less than 2 percent of the bound styrene in the styrene-isoprene rubber is in blocks of greater than 3 repeat units. Preferably less than 1 percent of the bound styrene in the styrene-isoprene rubber is in blocks of greater than 3 repeat units.

The styrene-isoprene copolymers of this invention also have a consistent composition throughout their polymer chains. In other words, the styrene content of the polymer will be the same from the beginning to the end of the polymer chain. No segments of at least 100 repeat units within the polymer will have a styrene content which differs from the total styrene content of the polymer by more than 10 percent. Such styrene-isoprene copolymers will typically contain no segments having a length of at least 100 repeat units which have a styrene content which differs from the total styrene content of the polymer by more than about 5 percent.

The polymerizations of this invention are initiated by adding an organolithium compound to the first polymerization zone containing the styrene and isoprene monomers. The organolithium compounds that can be employed in the process of this invention include the monofunctional and multifunctional initiator types known for polymerizing the conjugated diolefin monomers. The multifunctional organolithium initiators can be either specific organolithium compounds or can be multifunctional types which are not necessarily specific compounds but rather represent reproducible compositions of regulable functionality.

The choice of initiator can be governed by the degree of branching and the degree of elasticity desired for the polymer, the nature of the feedstock and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate the activity of the organolithium compound, thus necessitating the presence of sufficient lithium functionality so as to override such effects.

The multifunctional organolithium compounds which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds. Exemplary organomonolithium compounds include ethyl lithium, isopropyl lithium, n-butyllithium, sec-butyllithium, tert-octyl lithium, n-eicosyl lithium, phenyl lithium, 2-naphthyllithium, 4butylphenyllithium, 4-tolyllithium, 4-phenylbutyllithium, cyclohexyl lithium and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane and the like.

Exemplary multivinylphosphine compounds include trivinylphosphine, methyldivinylphosphine, dodecyldivinylphosphine, phenyldivinylphosphine, cyclooctyldivinylphosphine and the like.

Other multifunctional polymerization initiators can be prepared by utilizing an organomonolithium compound, further together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene and the like. Divinyl aromatic hydrocarbons containing up to 18 carbon atoms per molecule are preferred, particularly divinylbenzene as either the ortho, meta or para isomer, and commercial divinylbenzene, which is a mixture of the three isomers, and other compounds such as the ethyl styrenes, also is quite satisfactory.

Other types of multifunctional lithium compounds can be employed such as those prepared by contacting a sec- or tert-organomonolithium compound with isoprene, at a ratio of about 2 to 4 moles of the organomonolithium compound per mole of the isoprene, in the absence of added polar material in this instance, with the contacting preferably being conducted in an inert hydrocarbon diluent, though contacting without the diluent can be employed, if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyl lithium, isopropyl lithium, n-butyllithium, sec-butyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl and the like. Some highly preferred functionalized organolithium initiators are N-lithiopiperidine and 3-pyrrolidine-1-propyllithium.

The organolithium compound will normally be present in the polymerization medium in an amount which is within the range of about 0.01 to 1 phm (parts by 100 parts by weight of monomer) In most cases, from 0.01 phm to 0.1 phm of the organolithium compound will be utilized with it being preferred to utilize from 0.015 phm to 0.07 phm of the organolithium compound in the polymerization medium.

Functional initiators can also be utilized to initiate the polymerization. For instance, two functional initiators that can be used are available from FMC Corporation on a developmental basis. These initiators are 3-(N,N-dimethylamino)-1-propyllithium, known as DMAPLi (5), and 3-(t-butyldimethylsilyloxy)-1-propyllithium, known as TBDMSPLi (6).

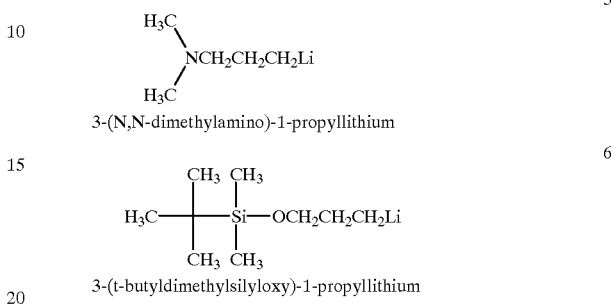

Polar modifiers can be used to modify the microstructure of the rubbery polymer being synthesized. However, the amount of polar modifier employed should be limited to keep the vinyl content of the styrene-isoprene rubber being synthesized at a low level. Ethers and amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine (TMEDA), N-methyl morpholine, N-ethyl morpholine, N-phenyl morpholine and the like. Dipiperidinoethane, dipyrrolidinoethane, tetramethylethylene diamine, diethylene glycol, dimethyl ether, TWEDA, tetrahydrofuran, piperidine, pyridine and hexamethylimine are representative of highly preferred modifiers. U.S. Pat. No. 4,022,959 describes the use of ethers and tertiary amines as polar modifiers in greater detail.

After the polymerization has reached the desired level of conversion it is terminated using a standard technique. The polymerization can be terminated with a conventional non-coupling type of terminator (such as, water, an acid and/or a lower alcohol) or with a coupling agent.

Coupling agents can be used in order to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl and the like. The divinylaromatic hydrocarbons are preferred, particularly divinylbenzene in either its ortho, meta or para isomer. Commercial divinylbenzene which is a mixture of the three isomers and other compounds is quite satisfactory.

While any multiepoxide can be used, liquids are preferred since they are more readily handled and form a relatively small nucleus for the radial polymer. Especially preferred among the multiepoxides are the epoxidized hydrocarbon polymers such as epoxidized liquid polyisoprenes and the epoxidized vegetable oils such as epoxidized soybean oil and epoxidized linseed oil. Other epoxy compounds, such as 1,2,5,6,9,10-triepoxydecane, also can be used.

Examples of suitable multiisocyanates include benzene-1,2,4-triisocyanate, naphthalene-1,2,5,7-tetraisocyanate and the like. Especially suitable is a commercially available product known as PAPI-1, a polyarylpolyisocyanate having an average of three isocyanate groups per molecule and an average molecular weight of about 380. Such a compound can be visualized as a series of isocyanate-substituted benzene rings joined through methylene linkages.

The multimines, which are also known as multiaziridinyl compounds, preferably are those containing three or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide and the like.

The multialdehydes are represented by compounds such as 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones can be represented by compounds such as 1,4,9,10-anthraceneterone, 2,3-diacetonylcyclohexanone and the like. Examples of the multianhydrides include pyromellitic dianhydride, styrene-maleic anhydride copolymers and the like. Examples of the multiesters include diethyladipate, triethyl citrate, 1,3,5-tricarbethoxybenzene and the like.

The preferred multihalides are silicon tetrahalides (such as silicon tetrachloride, silicon tetrabromide and silicon tetraiodide) and the trihalosilanes (such as trifluorosilane, trichlorosilane, trichloroethylsilane, tribromobenzylsilane and the like). Also preferred are the multihalogen-substituted hydrocarbons (such as, 1,3,5-tri(bromomethyl) benzene and 2,4,6,9-tetrachloro-3,7-decadiene) in which the halogen is attached to a carbon atom which is alpha to an activating group such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione and the like.

In addition to the silicon multihalides as described hereinabove, other metal multihalides, particularly those of tin, lead or germanium, also can be readily employed as coupling and branching agents. Difunctional counterparts of these agents also can be employed, whereby a linear polymer rather than a branched polymer results. Monofunctional counterparts can be used to end cap the rubbery polymer. For instance, trialkyl tin chlorides, such as tri-isobutyl tin chloride, can be utilized to end cap the rubbery polymer.

Broadly, and exemplary, in the case of tetrafunctional coupling agents, such as tin tetrachloride, a range of about 0.01 to 1 moles of coupling agent are employed per mole of lithium in the initiator. To attain a maximum level of coupling, it is preferred to utilize about 0.1 to about 2.5 moles of the coupling agent per mole of lithium in the initiator. The larger quantities tend to result in production of polymers containing terminally reactive groups or insufficient coupling. The coupling agent can be added in hydrocarbon solution (e.g., in cyclohexane) to the polymerization admixture in the final reactor with suitable mixing for distribution and reaction.

After the copolymerization has been completed, the styrene-isoprene elastomer can be recovered from the organic solvent. The styrene-isoprene rubber can be recovered from the organic solvent and residue by means such as decantation, filtration, centrification and the like. It is often desirable to precipitate the segmented polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" the living polymer by inactivating lithium end groups. After the segmented polymer is recovered from the solution, steam-stripping can be employed to reduce the level of volatile organic compounds in the rubber.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLES

The merits of diene-styrene anionic solution poylmerization, including precise control of molecular weight, macrostructure, microstructure, and functionalization are well established and were reported by D. G. Moore and G. L. Day at the Akron Rubber Group Meeting on Jan. 24, 1985. The additional performance advantages of low vinyl, random solution SBR prepared using distributed monomer feed technology have been previously demonstrated by M. L. Kerns, Z. G. Xu, and S. Christian, "*Synthesis of Random, Low Vinyl SSBR Using Distributed Monomer Feed Systems*", Paper #158 Presented at the ACS Rubber Division Meeting, September, 1999. This technology relies on the principle that differences in monomer reactivity ratios may be effectively dealt with by manipulation of monomer concentrations throughout the polymerization process. The ultimate result, when compared to materials produced using alternative methods, is an elastomer compound with superior hysteretic and wear characteristics.

Due to large differences in the reactivity ratios of isoprene and styrene, unmodified anionic SBR copolymeriztion leads to tapered block structures, see U.S. Pat. No. 3,558,575 to Keckler However, for solution SBR, addition of polar modifiers generally promotes randonization, albeit at the expense of increased vinyl content, see Antkowiak, T. A., Oberster, A. E.; Halasa, A. F.; Tate, D. P., *J Polym. Sci., Part A*-1, 1972, 10, 1319. It has been demonstrated that the situation is much more complicated in the case of solution styrene-isoprene (SIR) polyization, see Xu, Z. G.; Kerns, M. L.;Christian, S. *Polymer Preprints* 2000, 41(2), 1399. In the case of an unmodified SIR polymerization, the Situation is very similar to solution SBR in that the isoprenic diene monomer is preferentially incorporated into the polymer chain, see U.S. Pat. No. 5,173,550 to Hsu and Halass, and U.S. Pat. No. 5,359,016 to Hsu, Halasa and Matrana. This results in a polymer that is initially isoprene rich, but tapers into a styrene-rich tail. Addition of a traditional polar modifier such as tetramethylethylenediamine (TMEDA) to the SIR copolymerization process can have a dramatically different effect than is found in SBR. In this case, the rate of styrene polymerization is increased and the rate of isoprene incorporation is retarded. The result can be a polymer that is initially rich in styrene, but that tapers into a styrene deficient tail.

This invention effectively allows for the production of high sytrene SIRs of random composition at both high and low glass transition temperatures. The experimental design is first outlined, followed by model development, experimental procedures, and model validation.

Experimental Design

High styrene SIRs with three levels of modification were targeted by Tg (Table I). Samples in this paper were further classified as being conventional feed (a) or distributed feed (b). All samples were targeted to contain 30% styrene and have a $ML_{1+4}(100°\ C.)$ of 58. Batch polymerizations were used to develop the kinetic models necessary to implement a distributed feed process where needed. These preliminary studies are outlined in the Model Development section below.

TABLE I

TARGETED SIR COPOLYMERS

| Sample Number | Targeted Tg | Method |
|---|---|---|
| 1a | −40 | Unmodified |
| 1b | −40 | Unmodified Split Feed |
| 2 | −30 | Modified |
| 3 | −15 | Highly Modified |

Distributed Feed Sir Model Development

As previously mentioned, TMEDA modified copolymerizations of isoprene and styrene behave quite differently than their SBR analogues. Therefore, in order to design and implement a distributed monomer feed approach in making random styrene-isoprene copolymers for a continuous process, it was necessary to characterize these reaction behaviors over a broad range of modifier to initiator molar ratios ("MR" in the charts below).

Figure 1B:
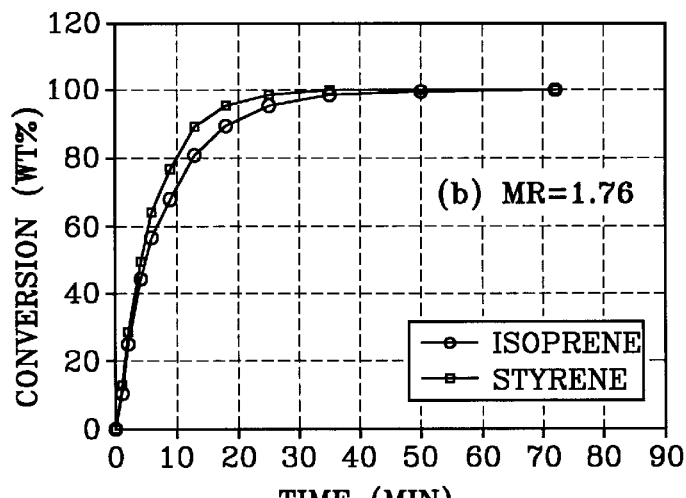
Figure 1C:
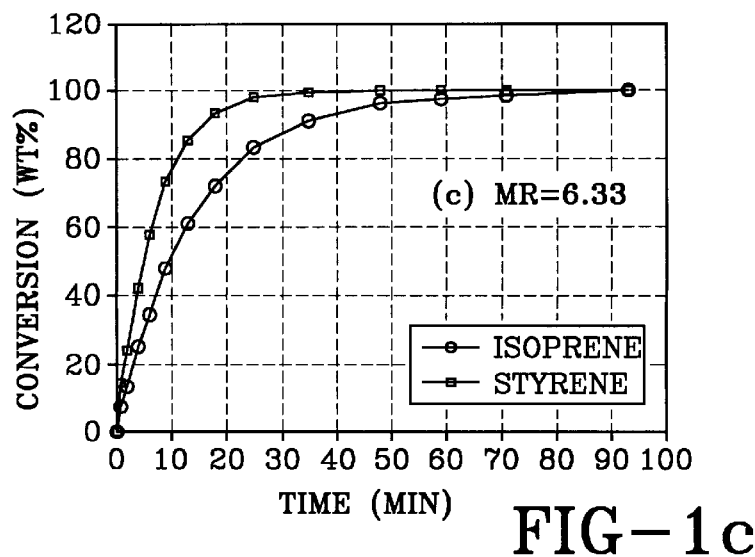

A series of batch polymerizations with different ratios of TMEDA to n-BuLi was designed to quantify the kinetics of styrene-isoprene copolymerization. Selected monomer conversions versus reaction time are shown in FIG. 1.

FIG. 1. Isoprene and styrene conversions in their batch polymerization at 90° C. at different modifier ratios: 0(a), 0.1.76(b), and 5.33(c), respectively.

In the absence of any modifier, isoprene reacts much faster than styrene. This yields a blocky polymer since about 60% of the styrene was converted after the depletion of isoprene monomer (FIG. 1(a)). As the modifier to initiator ratio was increased, the styrene reaction rate gradually increased and the isoprene reaction rate was slightly suppressed. When the modifier to initiator molar ratio reached around 0.8, the incorporation rates of both isoprene and styrene were found to be almost identical, resulting in a polymer with a random sequence distribution. Proton NMR results confirm the absence of block styrene in the polymer made under these conditions. In fact, when the modifier to initiator molar ratio lies in the moderate range (0.8 to 2.0), styrene-isoprene copolymers produced were homogeneous in their compositions and random in their sequence distributions (FIG. 1(b)). At high modifier ratios, the reaction rates of isoprene and styrene were found to be reversed: i.e., the incorporation of styrene was faster than that of isoprene (FIG. 1(c)). This implies that the copolymer produced at higher modifier ratios will be non-uniform as well. However, in this case the polymer formed at the beginning of polymerization was rich in styrene. Based on these batch polymerization results, one can envision and design strategies to produce random and uniform styrene-isoprene copolymers with different levels of 3,4-polyisoprene contents in continuous reactor chains. At low modifier levels in a multi-reactor continuous process, isoprene is more reactive than styrene and will thus need to be distributed into subsequent reactors to ensure the randomness of styrene in the polymer. At moderate modifier ratios (between 0.8 and 2.0), there is no need to distribute either monomer to produce random copolymer since both monomer incorporation rates are equivalent. At high modifier ratios, styrene becomes the more reactive monomer and has to be distributed to subsequent reactors to prevent forming polymer with a non-uniform sequence distribution.

In developing a reactor model to determine the monomer split ratios for a continuous process, it is necessary to know the reactivity ratios of isoprene ($r_1$) and styrene ($r_2$) at different modifier ratios. In this work, they were determined by employing the cumulative copolymer composition equation, see Rodriguez, F., *Principles of Polymer Systems*, $3^{rd}$ Ed., Hemisphere Publishing Co., New York, 1989. In order to do so, an objective function, the summation of difference square of copolymer compositions, was estimated from the experiment and copolymerization composition equation model. Using the solver provided in Microsoft Excel® software in which Newton's method was selected, the reactivity ratios for both monomers were determined at different modifier ratios, see Z. C. Xu, M. L. Kerns, and S. Christian, Polymer Preprints 2000, 41(2), 1322. To quantify these effects, an exponential relationship correlating reactivity ratio with modifier ratio, MR, was proposed and fitted. The fitted equations are For isoprene $r_1 = 0.296 + 18.160\ e^{-2.533 MR}$ (1)

For styrene $r_2 = 6.04 - 5.9\ e^{-0.2 MR}$ (2)

The solver works well when the two reactivity ratios are away from 1.0, but works poorly when the reactivity ratios are close to 1.0. There are other methods that are proven to be better when this occurs, see Rossignoli, P. J.; and Duever, T. A., *Polym. React. Eng.*, 1995, 3(4), 361–395, and, Giz, A., *Macromol Theory Simul.*, 1998, 7, 391–397.

It is worth mentioning that reactivity ratios may be sensitive to comonomer composition. A recent study showed an order of magnitude difference in the reactivity ratio of α-methyl styrene in its copolymerization with isoprene when the α-methyl styrene concentration was varied between 10 and 50 weight percent, see Halasa, A. F., "*New Elastomer for Tire Application*", *ACS National Meeting*, San Francisco, 2000. To obtain the most reliable information about the monomer reactivity ratios, the comonomer concentrations are ideally in a range which leads to 30 to 70% comonomer composition, see Soshi, R. M., *J Macromol. Sci-Chem.*, 1973, A7, 1231–1245.

Based upon the first principles approach: the material and energy balance of each species in each reactor, a more general mathematical model to the previous one was built for a continuous reactor chain with two reactors. The governing equations are described as follows:

$$F_{in,1} \cdot [St]_{in,1} - F_{out,1} \cdot [St]_1 - V_1 \cdot (k_{11}[P]_1[St]_1 + k_{21}[Q]_1[St]_1) = 0 \quad (3)$$

$$F_{in,1} \cdot [Ip]_{in,1} - F_{out,1} \cdot [Ip]_1 - V_1 \cdot (k_{12}[P]_1[Ip]_1 + k_{22}[Q]_1[Ip]_1) = 0 \quad (4)$$

$$F_{in,1} \cdot [P]_{in,1} - F_{out,1} \cdot [P]_1 - V_1 \cdot (k_{12}[P]_1[Ip]_1 - k_{21}[Q]_1[St]_1) = 0 \quad (5)$$

$$F_{in,1} \cdot [P]_{in,1} + [Q]_{in,1}) - F_{out,1} \cdot ([P]_1 + [Q]_1) = 0 \quad (6)$$

$$F_{in,2} \cdot [St]_{in,2} + F_{out,1} \cdot [St]_1 - F_{out,2} \cdot [St]_2 - V_2 \cdot (k_{11}[P]_2[St]_2 + k_{21}[Q]_2[St]_2) = 0 \quad (7)$$

$$F_{in,2} \cdot [Ip]_{in,2} + F_{out,1} \cdot [Ip]_1 - F_{out,2} \cdot [Ip]_2 - V_2 \cdot (k_{12}[P]_2[Ip]_2 + k_{22}[Q]_2[Ip]_2) = 0 \quad (8)$$

$$F_{out,1} \cdot [P]_1 - F_{out,2} \cdot [P]_2 - V_2 \cdot (k_{12}[P]_2[Ip]_2 - k_{21}[Q]_2[St]_2) = 0 \quad (9)$$

$$F_{out,1} \cdot ([P]_1 + [Q]_1) - F_{out,2} \cdot ([P]_2 + [Q]_2) = 0 \quad (10)$$

$$f = \frac{F_{in,2} \cdot ([St]_{in,2} \cdot Mw_{St} + [Ip]_{in,2} \cdot Mw_{Ip})}{F_{in,1} \cdot ([St]_{in,1} \cdot Mw_{St} + [Ip]_{in,1} \cdot Mw_{Ip}) + F_{in,2} \cdot ([St]_{in,2} \cdot Mw_{St} + [Ip]_{in,2} \cdot Mw_{Ip})} \quad (11)$$

$$= \frac{(F_{in,1} \cdot [St]_{in,1} - F_{out,1} \cdot [St]_1) \cdot Mw_{St}}{(F_{in,1} \cdot [St]_{in,1} - F_{out,1} \cdot [St]_1) \cdot Mw_{St} +} \\
\frac{(F_{in,1} \cdot [Ip]_{in,1} - F_{out,1} \cdot [Ip]_1) \cdot Mw_{Ip}}{(F_{in,2} \cdot [St]_{in,2} + F_{out,1} \cdot [St]_1 -} \\
\frac{(F_{out,2} \cdot [St]_2) \cdot Mw_{St}}{(F_{in,2} \cdot [St]_{in,2} + F_{out,1} \cdot [St]_1 -} \\
\frac{F_{out,2} \cdot [St]_2) \cdot Mw_{St} +}{(F_{in,2} \cdot [Ip]_{in,2} + F_{out,1} \cdot [Ip]_1 -} \\
F_{out,2} \cdot [Ip]_2) \cdot Mw_{Ip}$$

In these equations, [P] and [Q] are the concentrations of live polymers with the end group of styrene and isoprene, respectively. [St] and [Ip] are the concentrations of monomer styrene and isoprene in the reactor. $[St]_{in}$ and $[Ip]_{in}$ are the concentrations of monomer styrene and isoprene in the feed. $F_{in}$ and $F_{out}$ are the volumetric flow rates entering and leaving the reactor, respectively. The subscripts 1 and 2 correspond to the first and the second reactor respectively except when appearing in the rate constants. V is the reactor volume occupied by the reaction mass. f is weight percent of total monomer fed into the second reactor, that reflects the split ratio of monomers to the two reactors. Mw is the molecular weight of monomer. Propagation rate constants are represented by $k_{ij}$ with the chain end of group i by adding monomer j on it. Because of the association effects in anionic polymerization, the general forms of the rate constant for styrene ($k_{11}$) and isoprene ($k_{22}$) are given by $$k_{11}[P] = (1 - f_{MR}) \underbrace{\left[1.734 \cdot 10^{12} \exp\left(-\frac{18684}{RT}\right) \cdot [P]^{1/2}\right]}_{unmodified} + \underbrace{f_{MR}\left[2.878 \cdot 10^{11} \exp\left(-\frac{14870}{RT}\right) \cdot [P]\right]}_{modified} \quad (13)$$

$$k_{22}[Q] = (1 - g_{MR}) \underbrace{\left[6.253 \cdot 10^{10} \exp\left(-\frac{16886}{RT}\right) \cdot [Q]^{1/4}\right]}_{unmodified} + \underbrace{g_{MR}\left[2.56 \cdot 10^8 \exp\left(-\frac{10332}{RT}\right) \cdot [Q]\right]}_{modified} \quad (14)$$

where $f_{MR}$ (=0.5 MR) and $g_{MR}$ (=0.5 MR) are functions of modifier ratio, MR (i.e. the ratio of modifier to catalyst). The cross-propagation rate constants $k_{12}$ and $k_{21}$ are determined from the homo-polymerization rate constants and the reactivity ratios $r_{12}$ and $r_{21}$ described in equation (1) and (2).

The above model is the generalized version of the previous one developed for isoprene-styrene copolymerization in which only isoprene was diverted. In styrene-isoprene copolymerization, the reactive monomer will be reversed when TMEDA level varies from low to high. The current model will allow us to account for this by changing the monomer composition fed to the second reactor.

Given the reactor operating conditions, the independent variables in the above equations (Eqs. (3) to (12)) are the concentrations of monomer species and live polymer chains in two reactors and the amount of monomer fed to the second reactor,f. The total number of these variables is ten, which matches the number of equations. A software package, MathCad (6.0 for windows), was used to solve these variables.

Polymer Preparation

All of the continuous samples presented in this paper were prepared via anionic chain polymerization using n-butyllithium as the initiator. The polymers were prepared iisothermally at 90° C. in a continuous two-reactor chain where each reactor was equipped with two axial flow turbines (AFTs) and baffles. The agitation speed was 200–250 rpm with the AFTs pumping down. The polymerizations were controlled by a Foxboro distributive control system. The polymerizations were terminated with rosin acid at a level of 1 phr, and Wingstay® K antioxidant was added at a level of 0.5 phr. The samples were isolated via steam stripping, extruder dewatering, and oven drying. Isoprene and styrene solutions were made up at 15 weight percent in hexanes (mixed hexane isomers) and were purified by passing over molecular sieves and silica gel. The initiators, modifiers, rosin acid, and antioxidant were diluted with hexanes.

Analytical Testing

Reactor conversions were determined by gravimetric analysis. A Hewlett Packard 5890 Series II gas chromatograph was used for residual monomer analysis. Mooney viscosities ($ML_{1+4}(100\,°\,C.)$) were measured on a Flexsys MV2000. Glass transition temperatures (extrapolated onset from the reversing heat flow curve with a linear heating rate of 2° C./min, a modulation amplitude of 1.5° C. and a modulation period of 60 seconds) were measured on a TA Instruments, Inc Model 2910 MDSC. Molecular weights were measured by multi-angle light scattering (MALS) GPC. Microstructures were analyzed by 300 MHz H-1 NMR with a Varian Mercury VX300. Block styrene was determined by ozonolysis, see Tanaka, Y.; Sato, H.; Adachi, J. Rubber Chem. Technol. 1986, 59, 16.

Compound Preparation

All polymers were evaluated in model tread formulations with the experimental SIR being the sole elastomer. Carbon black and silica loadings were 70 and 65 phr respectively. In addition, the silica compound contained 10.4 phr X-266S (Si266 silane/N330 black, 50/50). Both compounds contained 26.25 phr of highly aromatic oil. The 1920 mL batches were mixed in a banbury using a two pass mix.

Model Validation

Figure 2:
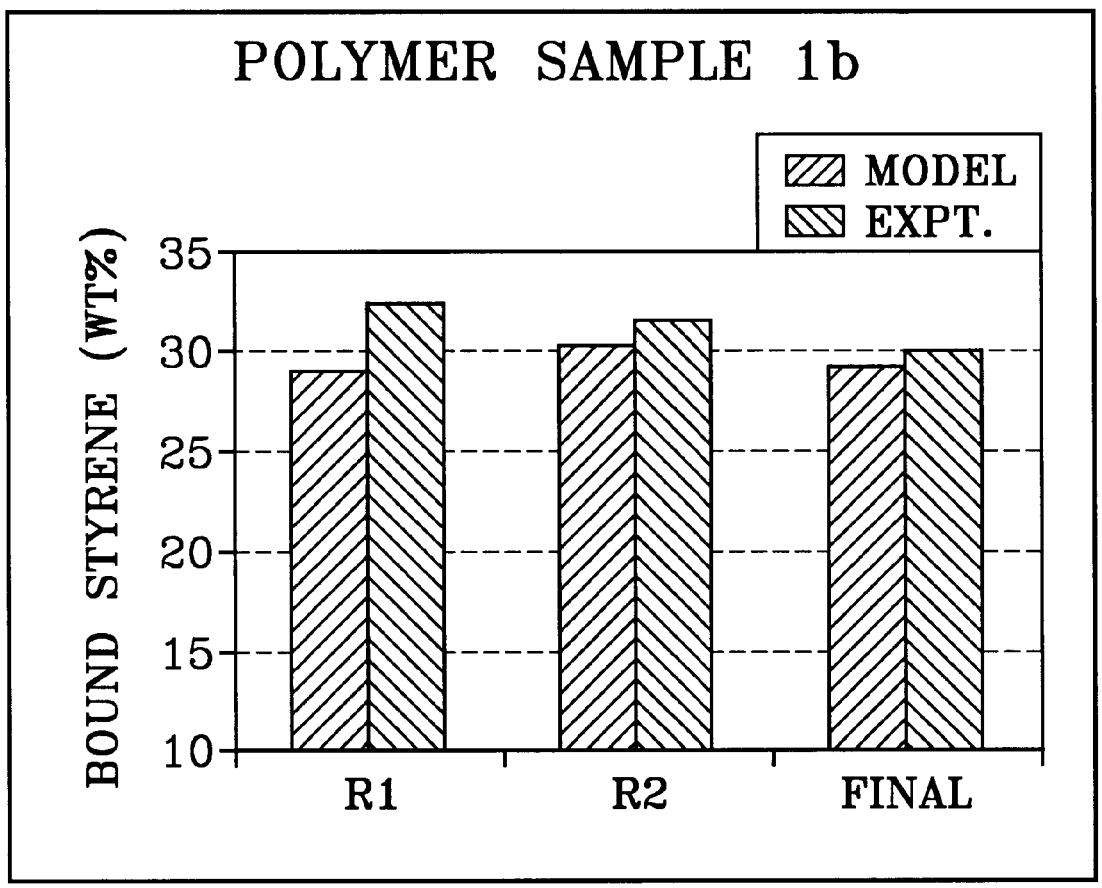

The reactor model has proven to be very useful in predicting monomer conversions and bound styrene for styrene/isoprene copolymerizations. It is expected that it should yield similar results for styrene/isoprene copolymerization. FIG. 2 shows the bound styrene in polymer sample 1b prepared by the distributed feed method. It is seen, by $^1$H NMR, that the model predictions are in agreement with the experimental results. The bound styrene in reactors 1 (R1) and 2 (R2) were calculated based upon residual monomer analysis.

FIG. 2. Comparison of bound styrene levels as predicted by our model and confirmed by NMR analyses.

Raw Sir Characterization

The experimental continuous SIRs were initially compared based on the raw polymer properties. Note that of the four samples analyzed in this study only one, (1b), was prepared using distributed feed technology. Bound styrene levels of all the samples fell within reasonable variation (+/−1.5%) of targeted values. Whereas 1,2-polyisoprene is essentially negligible, glass transition temperature variations seen in the polymers were largely determined by the 3,4-polyisoprene content of the samples. Table II summarizes raw polymer characterization data for the samples analyzed in this study.

TABLE II

RAW POLYMER PROPERTIES

| Sample Number: | 1a | 1b | 2 | 3 |
|---|---|---|---|---|
| Type: | unmodified | split feed | modified | highly modified |
| TMEDA/n-BuLi (mole ratio): | 0 | 0 | 0.8 | 2.0 |
| Tg (½ height (° C.)): | −37 | −38 | −31 | −15 |
| Styrene(wt %): | 31 | 29 | 29 | 28 |
| Block Styrene (wt % > 4S): | 7.4 | 0 | 0 | 0 |
| 3,4-Polyisoprene (wt %): | 8 | 5 | 9 | 17 |
| 1,2-Polyisoprene (wt %): | 0 | 0 | 0 | 2 |
| 1,4-Polyisoprene (wt %): | 61 | 65 | 62 | 52 |
| ML1 + 4(100° C.): | 61 | 61 | 55 | 59 |

As may be seen from the tabulated data, the unmodified conventional feed polymerization leads to significant levels of block styrene in the final low Tg polymer, 1a. However, by distributing part of the isoprene feed into the second reactor, the unmodified split feed process affords SIR, 1b, with a random sequence distribution at the lowest Tg. This, again, effectively demonstrates the value of the split feed system in preventing block styrene by manipulating monomer concentrations as a means of controlling their respective polymerization rates. This should manifest itself in 1b having superior compound performance over the blocky 1a polymer. The TMEDA modified polymerization at 0.8 mole TMEDA per mole n-BuLi leads to a uniform monomer sequence distribution in sample 2 as predicted by the batch polymerizations. However, in addition to randomizing the sequence distribution of the styrene and isoprene, the effect of the modification is to increase the level of 3,4-polyisoprene and the Tg of 2 by several degrees. Finally, the 2.0 TMEDA: n-BuLi ratio at the 90° C. polymerization temperature affords 3 as a random polymer. At this level of modification, the 3,4-polyisoprene content and resulting Tg of the elastomer are quite high. Mooney viscosities of all samples were consistent with the targeted value.

Physical Properties

Evaluation of the experimental samples in both silica and carbon black formulations was of primary interest in demonstrating the value of distributed feed technology. Although all of the samples were compounded, the most interesting comparisons are between samples 1a and 1b. Whereas differences between these samples confirm the benefit of random sequence distribution, samples 2 and 3 primarily illustrate the effect of increasing the Tg of the SSIR based compound. Given government mandated Corporate Average Fuel Economy (CAFE) standards for the automobile industry, hysteresis is one of the most important factors in selecting elastomers for tire tread applications. Hysteretic properties of the SSIR tread compounds were evaluated by Zwick Rebound (100° C.), Goodrich Flexometer Heat Buildup, and Rheometrics Solids Analyzer (RSA) tan δ (60° C., 11 Hz, ~0.1% strain). Data from these evaluations are summarized below in Table III.

TABLE III

HYSTERETIC ANALYSIS OF SSIR POLYMERS

| Sample Number: | 1a | 1b | 2 | 3 |
|---|---|---|---|---|
| Type: | unmodified | split feed | modified | highly modified |
| Carbon Black Formulation | | | | |
| Zwick Rebound % (100° C.): | 40 | 50 | 48 | 45 |
| Goodrich Flexometer ΔT(° C.): | 40 | 35 | 36 | 39 |
| RSA tan δ (60° C.): | 0.152 | 0.130 | 0.131 | 0.141 |
| Silica Formulation | | | | |
| Zwick Rebound % (100° C.): | 59.6 | 66.4 | 63.4 | 58.6 |
| Goodrich Flexometer ΔT(° C.): | 28.4 | 24.4 | 26.3 | 27.5 |
| RSA tan δ(60° C.): | 0.116 | 0.085 | 0.102 | 0.114 |

As may be seen from the data, in both compound formulations and over all three analytical test methods, the split feed technology produced the polymer having the lowest hysteresis. Advantages were often dramatic. For example, compared to the blocky 1a sample, 1b showed 15% lower tan δ (60° C.) in the carbon black formulation and 27% lower tan δ (60° C.) in the silica formulation. In agreement with this, Zwick Rebound (100° C.) results showed the distributed feed sample, 1b, to have higher rebound than 1a by 25% and 11% in the carbon black and silica formulations respectively. Differences of this magnitude would almost certainly translate to tire performance. Samples 2 and 3 illustrate the effect of higher levels of modification on hysteretic performance. Note that these samples outperform the lower Tg sample 1a in nearly all instances.

The hysteretic performance of 1b is likely attributable to a combination of several factors. First, randomization of styrene minimizes the formation of non-elastomeric block polymer which can contribute significantly to hysteresis, see U.S. Pat. No. 3,558,575 to Keckler. The likely reason for this behavior is that the styrene rich chain ends in the block SIR cannot effectively participate in the vulcanization process.

This leaves a significant portion of the polymer chain ends having a fair degree of translational mobility within the vulcanizate matrix. As the compound is stressed, these chain ends may move about relatively freely, generating friction and losing energy as heat. Second, from comparisons of molecular weights and radii of gyration calculated from light scattering measurements, we have found that the TMEDA modified samples are more branched than their unmodified counterparts, see Henning, S. K.; Kerns, M. L., "*Synthesis and Rheological Characterization of Branched versus Linear Solution Styrene-Butadiene Rubber*", presented at Deutsche Kautschuk Tagung 2000, September, 2000. Branched polymers are known to have more free chain ends which are elastically ineffective and thus contribute to increased hysteresis, see Flory, P.J. *Principles of Polymer Chemisty;* Cornell University: Ithaca, NewYork, 1953; p.461, and Aggarwal, S. L.; Fabris, H. J.; Hargis, I. G.; Livigni, R. A. *Polym. Prepr. —Am. Chem. Soc. Div. Polym. Chem.,* 1985, 26 (2), 3 Thus, as with SBR, the hysteretic advantages of the split feed SIR may be traced back to its linear macrostructure and lack of block styrene. The linearity of the split feed polymers is a direct result of the unmodified nature of the polymerization which is carried out at relatively low temperature under isothermal operating conditions. Although the split feed process has the versatility to be operated adiabatically as well as isothermally, operating under isothermal conditions at lower temperatures minimizes lithium hydride elimination. This reduces thermal branching and results in a polymer with improved hysteretic properties, see Flory, P. J. *Principles of Polymer Chemistry;* Cornell University: Ithaca, N.Y., 1953; p.461. Thus, as with SBR, the hysteretic advantages of the split feed SIR may be traced back to both its linear macrostructure and lack of block styrene.

Any elastomer designed for tire tread applications must also maintain a favorable balance between traction and treadwear. More than ever, tires are designed and advertised to provide high wet traction performance. However, in today's market where consumers expect high mileage warranty tires, abrasion resistance is also an important consideration. Rheometrics Solids Analyzer tan $\delta$ (11Hz, 0° C.) was used as a wet traction indicator and compared against the DIN abrasion test as a predictor of tire treadwear performance. The most interesting comparison is between samples 1a and 1b where compositional uniformity differences are found. For example, compared to 1a, the distributed feed sample 1b showed 32% higher tan $\delta$ (0° C.) and 9% lower DIN Abrasion volume loss (Table IV). This would indicate a material that has higher wet traction and higher abrasion resistance. The trend is also seen in the silica formulation where 1b has a 24% higher tan $\delta$ (0° C.) and 19% lower volume loss compared to 1a. Although wet traction and wear performance may generally be correlated back to the Tg of the polymers (see Aggarwal, S. L.; Fabris, H. J; Hargis, I. G.; Livigni, R. A. *Polym. Prepr.—Am. Chem. Soc. Div. Polym. Chem.,* 1985, 26 (2), 3), in these cases the split feed SIRs displayed superior performance at an equivalent glass transition temperature (Tg). The traction and wear performance indicators of samples 2 and 3 may be attributed to the higher Tg found in these more highly modified materials.

TABLE IV

WET TRACTION AND ABRASION INDICATORS

| Sample Number: | 1a | 1b | 2 | 3 |
|---|---|---|---|---|
| Type: | unmodified | split feed | modified | highly modified |
| Carbon Black Formulation | | | | |
| RSA tan $\delta$ (0° C.): | 0.203 | 0.268 | 0.318 | 0.765 |
| DIN Abrasion Volume Loss (mm$^3$): | 187 | 170 | 198 | 233 |
| Silica Formulation | | | | |
| RSA tan $\delta$ (0° C.): | 0.294 | 0.365 | 0.483 | 0.968 |
| DIN Abrasion Volume Loss (mm$^3$): | 189 | 154 | 176 | 188 |

With the exception of elongation being lower in the silica compound of 1b, the tensile properties were generally superior for the split feed sample 1b compared to 1a (Table V). For example, tensile at break, hot tear strength, and 300% modulus were higher while Shore A hardness was lower for 1b. These trends are found in both the silica and carbon black compounds. It is interesting to note that the M300/M100 ratio is slightly higher for 1b compared to 1a indicating a stronger interaction with both filler types. Comparing samples 2 and 3 we see that elongation at break tends to increase across the series from 1b→2→3. Likewise 300% modulus decreases in going from 1b→2→3 while Shore A hardness is relatively constant.

TABLE V

MISCELANEOUS PHYSICAL DATA FROM SSIR POLYMERS

| Sample Number: | 1a | 1b | 2 | 3 |
|---|---|---|---|---|
| Type: | unmodified | split feed | modified | highly modified |
| Carbon Black Formulation | | | | |
| Tensile @ Break (kPa): | 12900 | 14900 | 15100 | 15000 |
| Elongation @ Break (%): | 438 | 461 | 475 | 518 |
| 300% Modulus (kPa): | 9400 | 10400 | 10100 | 9100 |
| M300/M100 Ratio: | 3.0 | 3.7 | 3.4 | 3.4 |
| Tear Strength @100° C. (kN/m): | 37 | 42 | 38 | 45 |
| Shore A Hardness: | 77 | 70 | 71 | 70 |
| Silica Formulation | | | | |
| Tensile @ Break (kPa): | 16800 | 17900 | 17700 | 18400 |
| Elongation @ Break (%): | 597 | 498 | 585 | 646 |
| 300% Modulus (kPa): | 9500 | 11200 | 9800 | 9100 |
| M300/M100 Ratio: | 3.5 | 4.0 | 3.8 | 4.0 |
| Tear Strength @ 100° C. (kN/m): | 48 | 59 | 58 | 51 |
| Shore A Hardness: | 70 | 65 | 64 | 65 |

Isothermal distributed feed technology is clearly the best method Goodyear has tested for synthesis of random low vinyl styrene-diene elastomers for use in tire tread applications. This technology has now been extended to isoprene containing elastomers where dramatic performance benefits may be seen in both carbon black and silica based compounds. In the case of unmodified high styrene SIRS, we have found no block styrene in an elastomer with a relatively linear macrostructure. This manifests itself in the lowest hysteresis of any SIR we have tested. In addition, the SIR synthesized using distributed feed shows high wet traction and high abrasion resistance compared to the material produced using conventional feed technology. Furthermore, as has been demonstrated for SBR, in minimizing thermal branching and termination reactions inherent in high temperature processes, the split feed methodology will ultimately allow synthesis of SIRs with higher degrees of functionality than would be possible via an adiabatic or polar modified process. And finally, by avoiding the introduction of polar modifiers in our commercial operations, environmental concerns and demands on recycle and recovery processes are minimized.

While certain representative embodiments and details have been shown for the purpose of illustrating the subject invention, it will be apparent to those skilled in this art that various changes and modifications can be made therein without departing from the scope of the subject invention.

What is claimed is:

1. A process of synthesizing random styrene-isoprene rubber having a low level of branching and a low vinyl content which comprises: (1) continuously charging isoprene, styrene, an organolithium initiator, and an organic solvent into a first polymerization zone, (2) allowing the isoprene and styrene to copolymerize in the first polymerization zone to total conversion which is within the range of about 60 percent to about 95 percent to produce a polymer cement containing living styrene-isoprene chains, (3) continuously charging the polymer cement containing living styrene-isoprene chains and additional isoprene monomer into a second polymerization zone, wherein from 5 percent to 40 percent of the total amount of isoprene is charged into the second polymerization zone, (4) allowing the copolymerization to continue in the second polymerization zone to a conversion of the isoprene monomer of at least 90 percent, wherein the total conversion of styrene and isoprene in the second polymerization zone is limited to a maximum of 99 percent, (5) withdrawing a polymer cement of random styrene-isoprene rubber having living chain ends from the second reaction zone, (6) killing the living chain ends on the random styrene-isoprene rubber, and (7) recovering the random styrene-isoprene rubber from the polymer cement, wherein the copolymerizations in the first polymerization zone and the second polymerization zone are carried out at a temperature which is within the range of about 70° C. to about 100° C., and wherein the amount of styrene charged into the first polymerization zone is at least 2 percent more than the total amount of styrene bound into the random styrene-isoprene rubber.

2. A cement of living styrene-isoprene rubber which is comprised of an organic solvent and polymer chains that are derived from isoprene and styrene, wherein the polymer chains are terminated with lithium end groups, wherein the polymer chains have a vinyl content of less than 10 percent, wherein less than 5 percent of the total quantity of repeat units derived from styrene in the polymer chains are in blocks containing five or more styrene repeat units, and wherein the molar amount of polar modifier in the cement of the living styrene-isoprene rubber is at a level of less than 20 percent of the number of moles of lithium end groups on the polymer chains of the living styrene-isoprene rubber.

3. A process as specified in claim 1 wherein the living chain ends on the random styrene-isoprene rubber are killed by the addition of a coupling agent.

4. A process as specified in claim 3 wherein the coupling agent is tin tetrachloride.

5. A process as specified in claim 1 wherein the amount of styrene charged into the first polymerization zone is at least 4 percent more than the total amount of styrene bound into the random styrene-isoprene rubber.

6. A process as specified in claim 5 wherein the copolymerization in the second polymerization zone results in a conversion of the isoprene monomer of at least 95 percent.

7. A process as specified in claim 6 wherein from 7 percent to 35 percent of the total amount of isoprene charged is charged into the second polymerization zone.

8. A process as specified in claim 7 wherein the total conversion reached in the first polymerization zone is within the range of about 75 percent to about 95 percent.

9. A process as specified in claim 8 wherein the copolymerizations in the first polymerization zone and the second polymerization zone are carried out at a temperature which is within the range of 75° C. to 95° C.

10. A process as specified in claim 9 wherein the amount of styrene charged into the first polymerization zone is at least 6 percent more than the total amount of styrene bound into the random styrene-isoprene rubber.

11. A process as specified in claim 10 wherein the copolymerization in the second polymerization zone results in a conversion of the isoprene monomer of at least 98 percent.

12. A process as specified in claim 11 wherein from 12 percent to 33 percent of the total amount of isoprene changed is charged into the second polymerization zone.

13. A process as specified in claim 12 wherein the copolymerizations in the first polymerization zone and the second polymerization zone are carried out at a temperature which is within the range of 80° C. to 90° C.

14. A process as specified in claim 13 wherein the organolithium initiator is an alkyl lithium compound.

15. A process as specified in claim 14 wherein the alkyl lithium compound is n-butyl lithium.

16. A process as specified in claim 1 wherein the polymerization in the first polymerization zone and the polymerization in the second polymerization zone are carried out in the absence of polar modifiers.

17. The cement of living styrene-isoprene rubber as specified in claim 2 wherein said cement of the living styrene-isoprene rubber is void of polar modifiers.

18. The cement of living styrene-isoprene rubber as specified in claim 2 wherein said polymer chains are derived from about 5 weight percent to about 50 weight percent styrene and from about 50 weight percent to about 95 weight percent isoprene.

19. The cement of living styrene-isoprene rubber as specified in claim 2 wherein said polymer chains are derived from about 7 weight percent to about 40 weight percent styrene and from about 60 weight percent to about 93 weight percent isoprene.

20. A process of synthesizing random styrene-isoprene rubber having a low level of branching and a low vinyl content which comprises: (1) continuously charging isoprene, styrene, an organolithium initiator, a polar modifier, and an organic solvent into a first polymerization zone, (2) allowing the isoprene and styrene to copolymerize in the first polymerization zone to total conversion which is within the range of about 60 percent to about 95 percent to produce a polymer cement containing living styrene-isoprene chains, (3) continuously charging the polymer cement containing living styrene-isoprene chains and additional styrene monomer into a second polymerization zone, wherein from 5 percent to 40 percent of the total amount of styrene is charged into the second polymerization zone, (4) allowing the copolymerization to continue in the second polymerization zone to a conversion of the styrene monomer of at least 90 percent, wherein the total conversion of styrene and isoprene in the second polymerization zone is limited to a maximum of 99 percent, (5) withdrawing a polymer cement of random styrene-isoprene rubber having living chain ends from the second reaction zone, (6) killing the living chain ends on the random styrene-isoprene rubber, and (7) recovering the random styrene-isoprene rubber from the polymer cement, wherein the copolymerizations in the first polymerization zone and the second polymerization zone are carried out at a temperature which is within the range of about 70° C. to about 100° C., and wherein the amount of isoprene charged into the first polymerization zone is at least 2 percent more than the total amount of isoprene bound into the random styrene-isoprene rubber.

* * * * *